Patented Aug. 26, 1924.

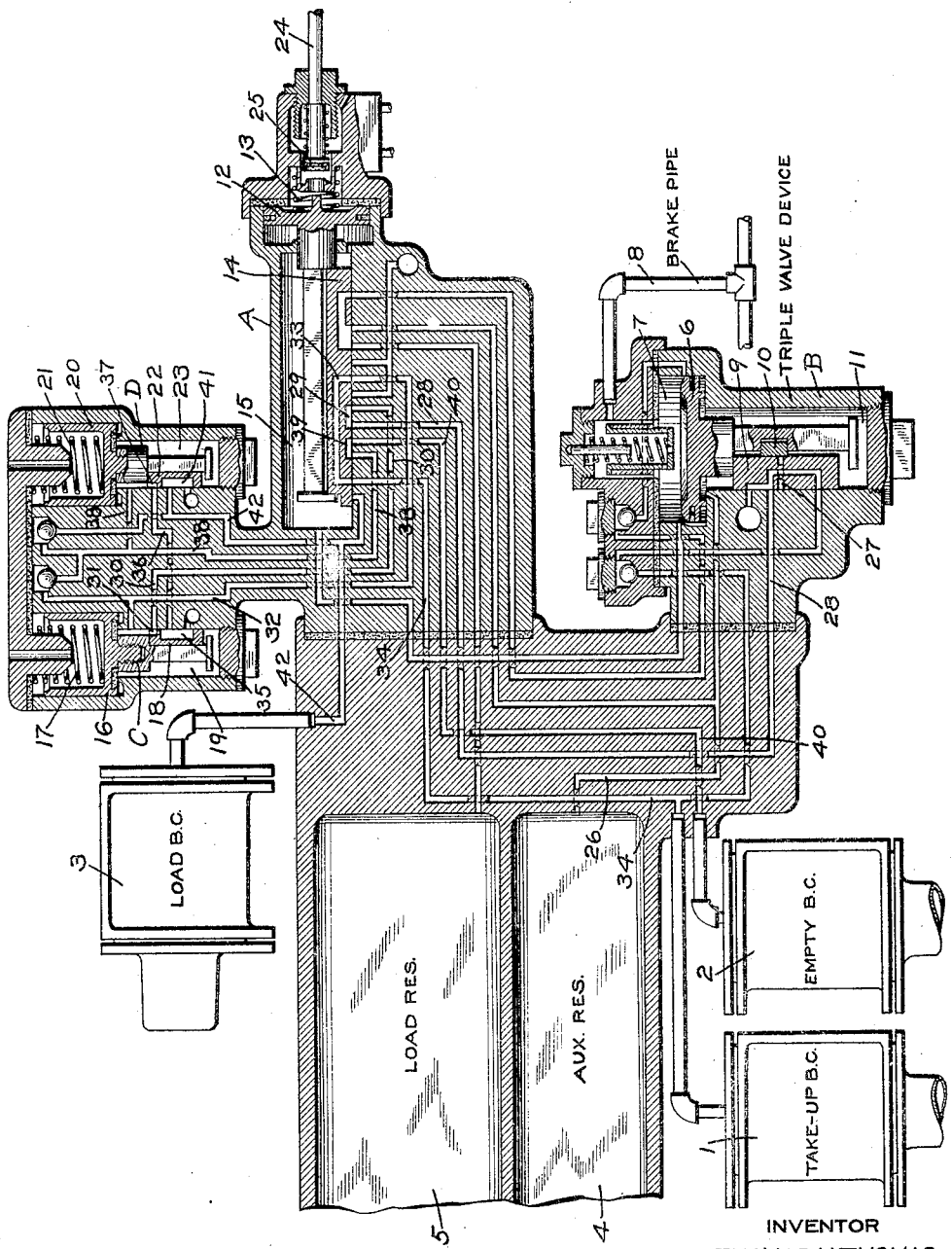

1,505,981

UNITED STATES PATENT OFFICE.

THOMAS H. THOMAS, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

LOAD BRAKE DEVICE.

Application filed October 4, 1923. Serial No. 666,595.

*To all whom it may concern:*

Be it known that I, THOMAS H. THOMAS, a citizen of the United States, residing at Edgewood, in the county of Allegheny and State of Pennsylvania, have invented new and useful Improvements in Load Brake Devices, of which the following is a specification.

This invention relates to fluid pressure brakes and more particularly to a load brake equipment.

In my prior Patent No. 1,390,593, dated September 13, 1921, a load brake equipment is disclosed in which a take-up brake cylinder, an empty brake cylinder, and a load brake cylinder are provided. When set for loaded car braking and the brakes are applied, a transfer valve device operates at a predetermined pressure in the take-up brake cylinder to cut off the further flow of fluid to the take-up brake cylinder and open communication through which fluid is supplied to the empty brake cylinder. When the pressure in the empty brake cylinder has been increased to a predetermined degree, a second transfer valve device operates to cut off further flow of fluid to the empty brake cylinder and open communication through which fluid is supplied to the load brake cylinder.

With the patent construction, the transfer valve devices are maintained in one position by brake pipe pressure and it has been found that in some instances, there is a possibility of leakage from the brake pipe to the brake cylinders, which tends to delay or slow down the release of the brakes.

The principal object of my invention is to provide a load brake equipment having transfer valve devices adapted to overcome the above difficulty.

In the accompanying drawing, the single figure is a diagrammatic sectional view of a load brake equipment embodying my invention, with the change-over valve device adjusted for load braking.

As shown in the drawing, the equipment may comprise a take-up brake cylinder 1, an empty brake cylinder 2, a load brake cylinder 3, an auxiliary reservoir 4, a load reservoir 5, a change-over valve device A, triple valve device B, transfer valve device C, and transfer valve device D.

The triple valve device B may comprise a piston 6 contained in piston chamber 7, which is connected to the usual brake pipe 8, and slide valves 9 and 10, contained in valve chamber 11 and adapted to be operated by piston 6.

The change-over valve device A may comprise a piston 12, contained in piston chamber 13 and a slide valve 14, contained in valve chamber 15 and adapted to be operated by piston 12.

The transfer valve device C may comprise a piston 16 subject on one side to the pressure of a spring 17 and adapted to operate a slide valve 18 contained in valve chamber 19. The transfer valve device D comprises a piston 20, subject on one side to the pressure of a spring 21 and adapted to operate a slide valve 22, contained in valve chamber 23.

For the purposes of the present invention, it is not deemed necessary to describe the complete operation of the equipment, as this is fully described in my prior Patent No. 1,390,593, hereinbefore referred to, and consequently only the operation of the equipment when set for load braking and the brakes are applied will be described.

The change-over valve device A is set for load braking by pulling out the manually operable rod 24, which causes valve 25 to be lifted from its seat, so that fluid under pressure is vented from piston chamber 13. The fluid pressure in valve chamber 15 then acts on piston 12 to shift the parts to load position, as shown in the drawing.

When the pressure in brake pipe 8 is reduced to effect an application of the brakes, the triple valve piston 6 is moved in the usual manner to application position, in which fluid is supplied from the auxiliary reservoir 4 to the take-up brake cylinder 1 through passage 26, valve chamber 11, port 27 in slide valve 9, passage 28, cavity 29 in slide valve 14, passage 30, and through cavity 31 in transfer slide valve 18 to valve chamber 19. From valve chamber 19 fluid flows to the take-up brake cylinder 1 through passage 32, cavity 33 in slide valve 14, and passage 34.

The pressure of fluid supplied to the take-up brake cylinder 1, acts in valve chamber 19 on the exposed seated face of piston 16 and when the pressure has been increased to a predetermined degree, slightly exceeding the pressure of spring 17, the piston 16 will shift the slide valve 18 to a position in which communication from the auxiliary reservoir to the take-up brake cylinder 1 is cut off and in which the empty brake cylinder 2 is connected to the auxiliary reservoir from passage 30, through cavity 35 in slide valve 18, passage 36, cavity 37 in slide valve 22 to valve chamber 23 and thence to the empty brake cylinder 2, through passage 38, cavity 39 in slide valve 14, and passage 40.

The pressure of fluid supplied to the empty brake cylinder 2, acts in valve chamber 23 on the exposed seated face of piston 20 and when the pressure has been increased to a predetermined degree, slightly exceeding the pressure of spring 21, the piston 20 will shift slide valve 22 to a position in which communication from the auxiliary reservoir to the empty brake cylinder 2 is cut off and in which communication from the auxiliary reservoir to the load brake cylinder 3 is established from passage 36, through cavity 41 and slide valve 22 and passage 42.

It will be seen from the above description of the construction and operation, that once the transfer valve devices are not subjected in any way to brake pipe pressure, there can be no possible leakage of fluid into the brake cylinder in releasing the brakes.

Having now described my invention, what I claim as new and desire to secure by Letters Patent, is:—

1. In a load brake apparatus, the combination with a plurality of brake cylinders, of a spring and a valve device subject to the opposing pressures of said spring and one brake cylinder for controlling the supply of fluid under pressure to another brake cylinder.

2. In a load brake apparatus, the combination with a plurality of brake cylinders, of a spring and a valve device subject to the pressure of said spring which tends to hold said valve device in position for opening a communication through which fluid is supplied to one brake cylinder, said valve device being subject to the opposing pressure of another brake cylinder which tends to close said communication.

3. In a load brake apparatus, the combination with a take-up brake cylinder and an empty brake cylinder, of a spring and a valve device subject to the opposing pressures of said spring and said take-up brake cylinder for controlling communication through which fluid under pressure is supplied to said empty brake cylinder.

4. In a load brake apparatus, the combination with an empty brake cylinder and a load brake cylinder, of a spring and a valve device subject to the opposing pressures of said spring and said empty brake cylinder for controlling the supply of fluid under pressure to said load brake cylinder.

5. In a load brake apparatus, the combination with a take-up brake cylinder, an empty brake cylinder, and a load brake cylinder, of a spring, a valve device subject to the opposing pressures of the take-up brake cylinder and said spring for controlling the supply of fluid under pressure to said empty brake cylinder, a second spring, and a valve device subject to the opposing pressures of the second spring and the empty brake cylinder for controlling the supply of fluid under pressure to the load brake cylinder.

6. In a load brake apparatus, the combination with a plurality of brake cylinders, of a spring and a valve device subject on one side to the pressure of said spring and atmospheric pressure and on the opposite side to the pressure in one brake cylinder for controlling communication through which fluid under pressure is supplied to another brake cylinder.

In testimony whereof I have hereunto set my hand.

THOMAS H. THOMAS.